US009519703B2

(12) United States Patent
Agarwal et al.

(10) Patent No.: US 9,519,703 B2
(45) Date of Patent: Dec. 13, 2016

(54) REFINING SEARCH RESULTS FOR A COMPOUND SEARCH QUERY

(71) Applicant: International Business Machines Corporation, Armonk, NY (US)

(72) Inventors: Saurabh Agarwal, Gurgaon (IN); Dhanashree Srivastava, Pune (IN)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 13/847,618

(22) Filed: Mar. 20, 2013

(65) Prior Publication Data
US 2014/0289236 A1 Sep. 25, 2014

(51) Int. Cl.
*G06F 17/30* (2006.01)

(52) U.S. Cl.
CPC .............. *G06F 17/30663* (2013.01)

(58) Field of Classification Search
CPC .... G06F 17/30864; G06Q 10/10; G06Q 30/02
USPC ......................................... 707/725
See application file for complete search history.

(56) References Cited

U.S. PATENT DOCUMENTS

| 6,625,596 | B1* | 9/2003 | Nunez |
| 8,214,350 | B1* | 7/2012 | Chamberlain et al. ....... 707/709 |
| 2001/0047355 | A1 | 11/2001 | Anwar |
| 2005/0210001 | A1 | 9/2005 | Lee |
| 2005/0283465 | A1* | 12/2005 | Dettinger .......... G06F 17/30389 |
| 2006/0167842 | A1* | 7/2006 | Watson ............................ 707/3 |
| 2006/0167864 | A1 | 7/2006 | Bailey et al. |
| 2006/0218141 | A1* | 9/2006 | Tuttle et al. ...................... 707/5 |
| 2008/0172368 | A1 | 7/2008 | Chowdhury et al. |
| 2009/0222444 | A1 | 9/2009 | Chowdhury et al. |
| 2009/0327271 | A1* | 12/2009 | Amitay et al. .................... 707/5 |
| 2010/0114925 | A1* | 5/2010 | Shafer et al. ................. 707/759 |
| 2010/0191740 | A1 | 7/2010 | Lu et al. |
| 2011/0082859 | A1 | 4/2011 | Deng et al. |
| 2011/0113100 | A1* | 5/2011 | Chawla ............... G06F 17/3087 709/205 |
| 2013/0073387 | A1* | 3/2013 | Heath ................... G06Q 50/01 705/14.53 |

OTHER PUBLICATIONS

Dave Ingalls, "Search Engine Marketing Categorized Search" Copyright 2001-2012 Dave Ingalls [online], [retrieved on Jan. 15, 2013]. Retrieved from the Internet <URL: http://daveingalls.com/internet-marketing-course/categorized-search>.

(Continued)

*Primary Examiner* — Scott A Waldron
*Assistant Examiner* — Dongming Wang
(74) *Attorney, Agent, or Firm* — Maeve Carpenter

(57) ABSTRACT

A method for refining search results. The method includes receiving a search query and in response to determining the search query is a compound search query, the method includes parsing the compound search query into at least two sub-queries. The method includes performing a search for each of the sub-queries and receiving a set of results from each search. The method then includes receiving a selection of a received result from one of the results sets and performing a second search using the selected received result and a sub-query not associated with the selected received result.

12 Claims, 4 Drawing Sheets

(56) References Cited

OTHER PUBLICATIONS

Kules et al., "Helping users understand search results with categorized overviews" HCIL University of Maryland, Last updated Jun. 19, 2006 [online], [retrieved on Jan. 15, 2013]. Retrieved from the Internet <URL: http://www.cs.umd.edu/hcil/categorizedsearch/>.

* cited by examiner

REFINING SEARCH RESULTS FOR A COMPOUND SEARCH QUERY

FIELD OF THE INVENTION

The present invention relates generally to the field of search engines, and more particularly to refining and identifying meaningful search results for a compound search query using additional results obtained from searching sub-queries of the search query.

BACKGROUND OF THE INVENTION

Search engines operate to retrieve a set of search results that correspond to a search query inputted by a user. Search engines treat user input as a single query and return search results which most closely match the entire search query. Consequently, some context embedded in the grammar of the search query may be lost and some search results may direct a user to internet resources or documents that do not interest the user, because the search results match the search query verbatim. Analytics, such as ranking search results based on time, location, or relevancy, can help the user find the closest matching result of a simple search query but analytics may not help a user searching for multiple topics.

SUMMARY

Embodiments of the present invention disclose a computer method, computer program product, and computer system for refining search results. The method includes receiving a search query and in response to determining the search query is a compound search query, the method includes parsing, by one or more computer processors, the compound search query into at least two sub-queries. The method includes performing a search for each of the sub-queries and receiving a set of results from each search. The method includes receiving a selection of a received result from one of the results sets and performing a second search using the selected received result and a sub-query not associated with the selected received result.

DETAILED DESCRIPTION

Figure 1:
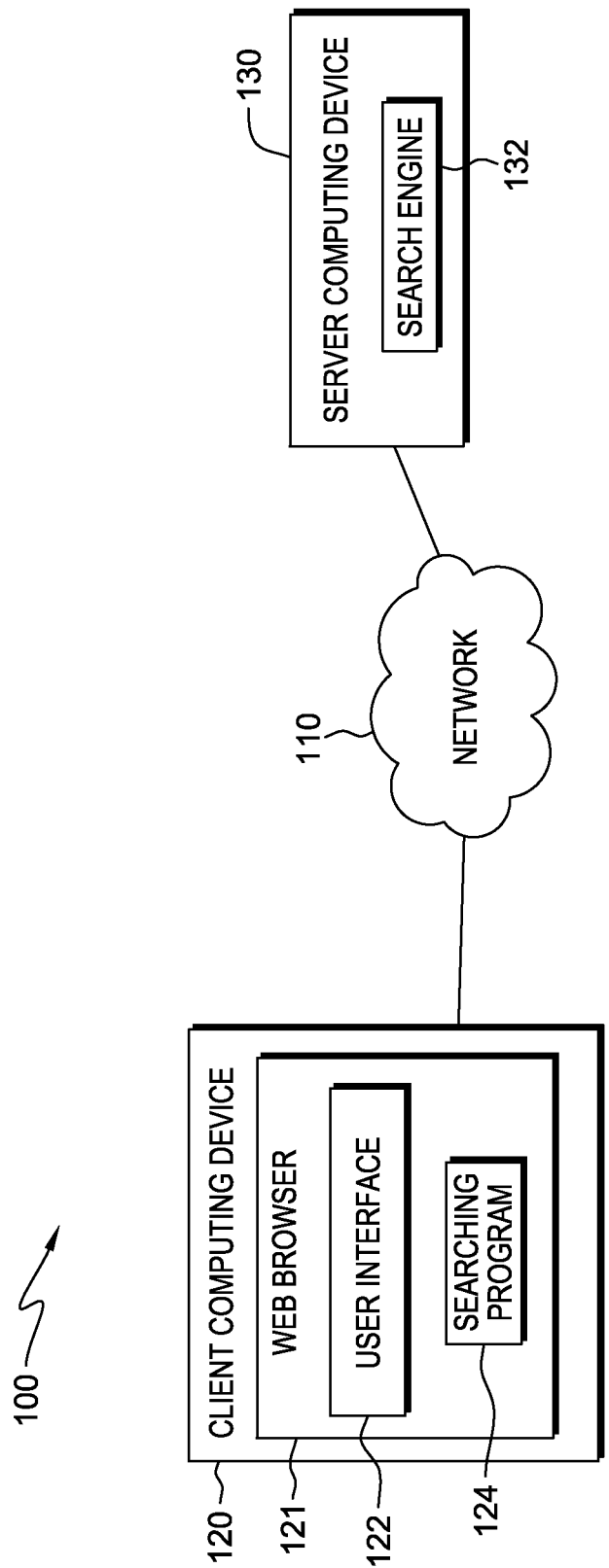
FIG. 1 is a functional block diagram illustrating a distributed data processing environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a distributed data processing environment, generally designated 100, in accordance with one embodiment of the present invention.

Distributed data processing environment 100 includes client computing device 120 and server computing device 130, all interconnected over network 110. Network 110 can be, for example, a local area network (LAN), a wide area network (WAN) such as the internet, or a combination of the two, and can include wired, wireless, or fiber optic connections. In general, network 110 can be any combination of connections and protocols that will support communication between client computing device 120 and server computing device 130.

Client computing device 120 includes web browser 121, user interface (UI) 122, and searching program 124. In various embodiments of the present invention, client computing device 120 can be a laptop computer, a personal digital assistant (PDA), a smart phone, or any programmable electronic device capable of communicating with server computing device 130 via network 110. Web browser 121 is a software application capable of retrieving and presenting information obtained from the World Wide Web. In an exemplary embodiment of the present invention, web browser 121 requests, via network 110, results of a search performed by search engine 132 on server computing device 130, performed using search queries entered into UI 122. In various embodiments, web browser 121 may be an information retrieval system designed to provide access to information stored on a computer system or within a computing environment. UI 122 may be, for example, a graphical user interface (GUI) or a web user interface (WUI) and can display text, documents, web browser windows, user options, application interfaces and instructions for operation. Client computing device 120 may include internal and external hardware components, as depicted and described in further detail with respect to FIG. 4.

Searching program 124 can be an add-on or browser extension for modifying the interface or behavior of web browser 121. Searching program 124 analyzes an original search query entered into UI 122 by a user operating on client computing device 120. Searching program 124 can parse the original search query into sub-queries, transmit each sub-query to search engine 132, and search engine 132 returns results for each sub-query. Searching program 124 ranks the results for each sub-query and presents the results to the user. Each sub-query can also act as an additional tool to refine the search results obtained for each other sub-query. For example, the user may select an option to refine search results around a chosen sub-query result, thereby narrowing down other sub-query results. While searching program 124 in FIG. 1 is included within web browser 121, one of skill in the art will appreciate that in other embodiments, searching program 124 may be located elsewhere within distributed data processing environment 100 and can communicate with web browser 121 via network 110.

Server computing device 130 includes search engine 132 and can be a laptop computer, tablet computer, netbook computer, PC, a desktop computer, PDA, a smart phone, or any programmable electronic device capable of communicating with client computing device 120 via network 110, and with other various components and devices within distributed data processing environment 100. In an embodiment of the present invention, server computing device 130 can represent a computing system utilizing clustered computers and components to act as a single pool of seamless resources when accessed through a network. This is a common implementation for data centers and for cloud computing applications. In an exemplary embodiment of the present invention, search engine 132 is a web search engine used to crawl, index and search for information on the World Wide Web.

Figure 2:
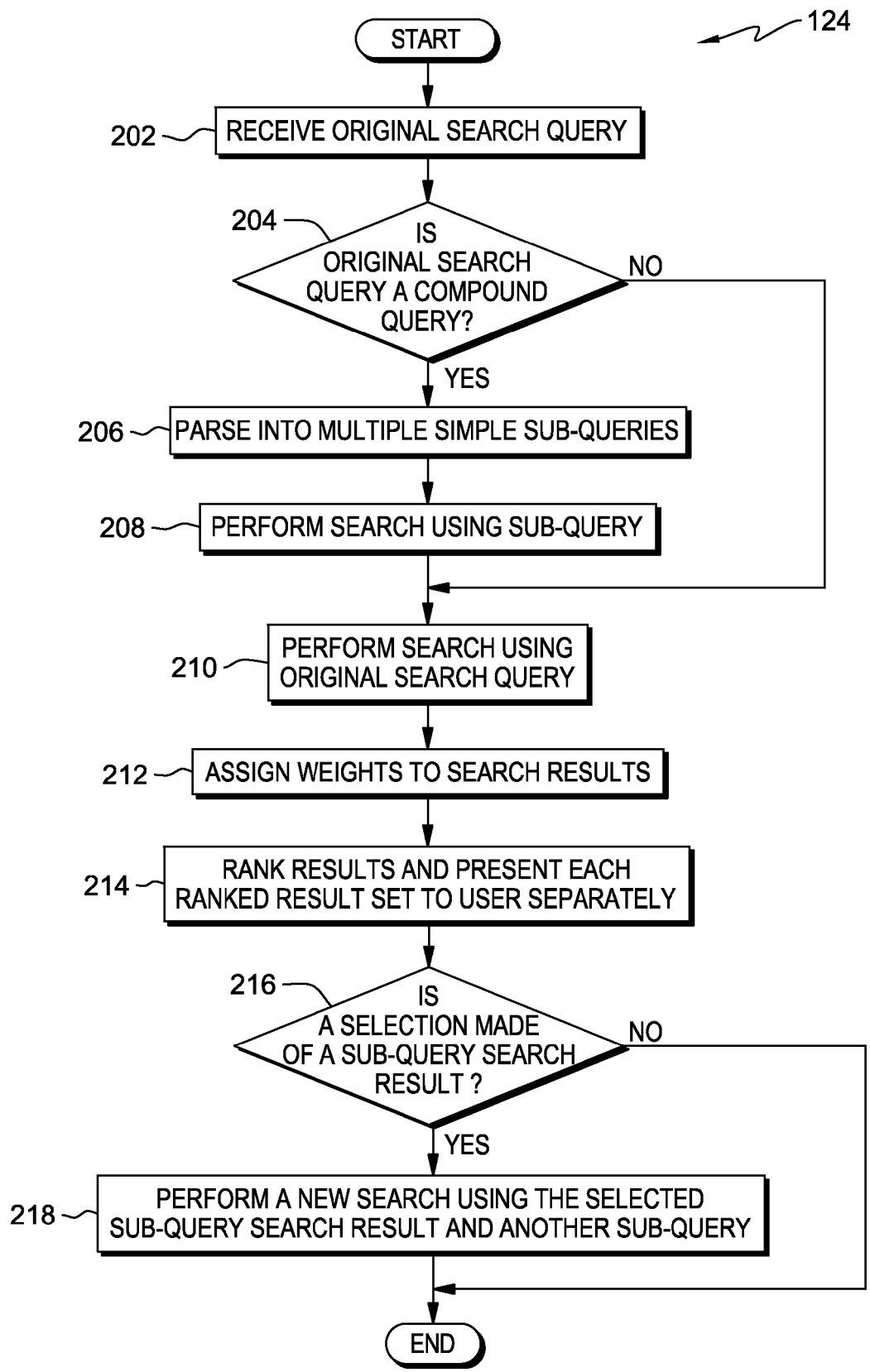
FIG. 2 is a flowchart depicting operational steps of a searching program for parsing a compound search query into sub-queries and returning search results for each search query and sub-query, in accordance with an embodiment of the present invention.

FIG. 2 is a flowchart depicting operational steps of searching program 124 for parsing a compound search query into sub-queries and returning search results for each search query and sub-query, in accordance with an embodiment of the present invention.

Searching program 124 receives an original search query (step 202). The original search query, which can be natural language plain text, is entered by a user into UI 122 in order to obtain search results on the entered search query from search engine 132. Searching program 124 determines whether the original search query is a compound query (decision block 204). A compound query is any query that is a semantic combination of two or more simple sub-queries and contains text separated by operators, such as "and" or "or." If the original search query is not a compound query (decision block 204, no branch), for example, one word or simple phrase, such as "family restaurant," searching program 124 performs a search using the original search query (step 210).

If the original search query is a compound query (decision block 204, yes branch), for example, "family restaurant and miniature golf," searching program 124 parses the original search query into multiple simple sub-queries (step 206). In an exemplary embodiment, the original search query is split into multiple simple sub-queries using a semantic parser, or any other computer program capable of understanding a natural language using a set of grammar rules and breaking down natural language sentences or other strings of words into meaningful components, such as words or phrases. Searching program 124 performs a search using each of the sub-queries (step 208). For example, "family restaurant and miniature golf" may be broken down into "family restaurant" and "miniature golf" sub-queries, and search engine 132 will return search results for each sub-query.

Searching program 124 performs a search using the original search query (step 210). In addition to returning results for each sub-query, searching program 124 returns results for the original search query. Searching program 124 assigns weights to search results (step 212). In an exemplary embodiment of the present invention, a weight is assigned to each search result obtained, including results from the original search query and results from each sub-query, in order to rank the results. The weight for each search result can be determined based on how relevant the search result is to the search query text, or based on how recent, or timely, the content of the search result is, with more recent content weighted and ranked higher than older content. In another embodiment of the present invention, the weight for each search result may be determined by searching program 124 based on user preferences that a user has set prior to a search. User preferences may include set preferences for factors such as geographic location data, social media data, or the user's prior history of searches.

Searching program 124 ranks the search results and presents each ranked result set to the user separately (step 214). The search results for each sub-query and for the original search query are ranked based on the weights assigned to each search result. Each ranked result set obtained from each search is separately presented to the user. In an exemplary embodiment of the present invention, the results for each sub-query and the original search query are displayed on different tabs in a web browser window on UI 122, as is further shown and discussed with reference to FIG. 3.

Searching program 124 determines whether a selection is made of a sub-query search result (decision block 216). The selected sub-query result may be, for example, a miniature golf location the user is interested in visiting. If a selection is not made (decision block 216, no branch), searching program 124 ends. If a selection is made of a sub-query search result (decision block 216, yes branch), searching program 124 performs a new search using the selected sub-query search result and another sub-query (step 218). Searching program 124 can use each sub-query as an additional tool to further refine the selected search result when performing the new search, for example, a search for family restaurants near the selected miniature golf course. The new search is performed using a new search query made up of the selected result, for example, a miniature golf course name, and a sub-query not associated with the selected sub-query search result. In an exemplary embodiment, a hyperlink may be displayed below each sub-query search result containing language to refine the search by incorporating limits or features of another sub-query. For example, a user may select to "show more 'family restaurant' closer to this 'miniature golf' result" which would allow the user to narrow down the results for a family restaurant by searching for those family restaurants near the chosen miniature golf venue.

Figure 3:
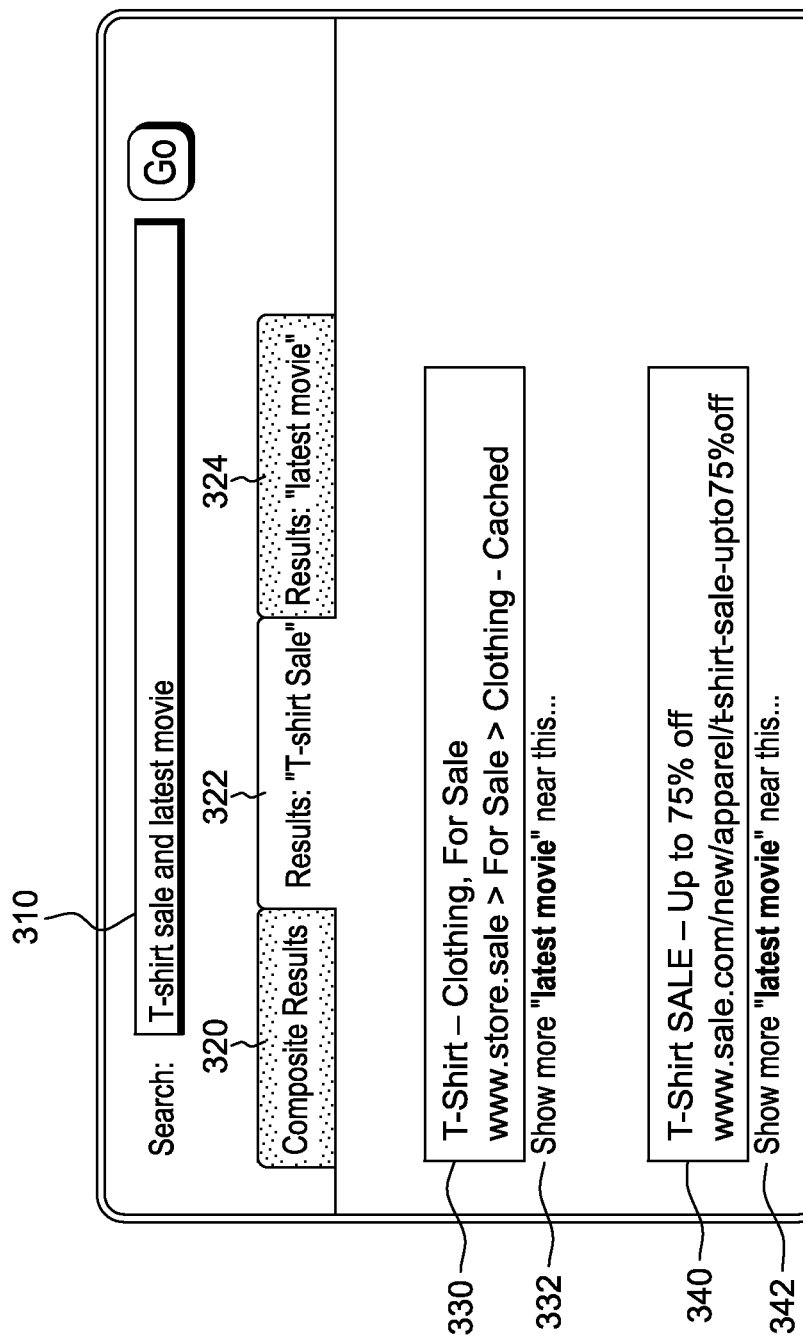
FIG. 3 illustrates an exemplary user interface displaying search results provided by the searching program of FIG. 2, in accordance with an embodiment of the present invention.

FIG. 3 illustrates an exemplary user interface, such as UI 122 on client computing device 120, displaying results provided by searching program 124, in accordance with an embodiment of the present invention.

Text 310 is the original search query entered into UI 122. Composite search results ranked and presented to the user for the original search query are displayed on tab 320. Search results for each sub-query, here, "t-shirt sale" and "latest movie", are ranked and shown on tab 322 and tab 324, respectively. In FIG. 3, displayed currently is tab 322, which includes search results for "t-shirt sale," shown by text block 330 and text block 340. In the exemplary embodiment, shown below each sub-query search result is a hyperlink, hyperlink 332 and hyperlink 342, to refine the sub-query search results with a search using limits of another sub-query. Selection of hyperlink 332 or hyperlink 342 would allow a user to refine and narrow down search results for "latest movie" locations by searching for "latest movie" near the chosen "t-shirt sale", resulting in movie theaters near the chosen t-shirt store.

Figure 4:
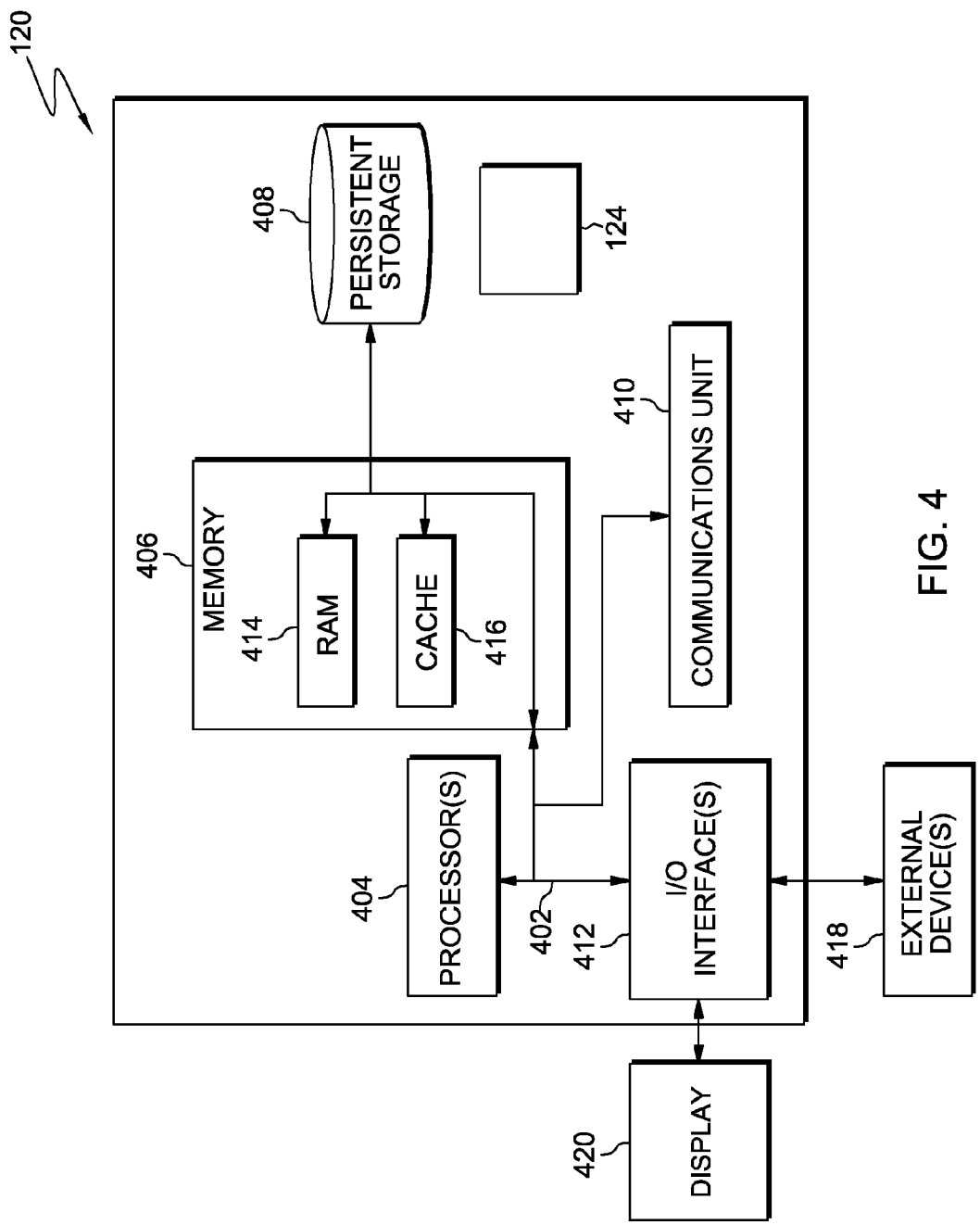
FIG. 4 depicts a block diagram of the internal and external components of a data processing system, such as the client computing device or the server computing device of FIG. 1, in accordance with an embodiment of the present invention.

FIG. 4 depicts a block diagram of components of client computing device 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Client computing device 120 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Searching program 124 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including between client computing device 120 and server computing device 130. In these examples, communications unit 410 includes one or more network interface cards. Communications unit 410 may provide communications through the use of either or both physical and wireless communications links. Searching program 124 may be downloaded to persistent storage 408 through communications unit 410.

I/O interface(s) 412 allows for input and output of data with other devices that may be connected to client computing device 120. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., searching program 124, can be stored on such portable computer-readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for refining search results, the method comprising the actions of:
   receiving, by one or more computer processors, a search query;
   determining, by one or more computer processors, whether the search query is a compound search query, wherein a compound search query includes at least two search queries separated by at least one logical operator;
   in response to determining the search query is a compound search query, parsing, by one or more computer processors, the compound search query into at least a first sub-query and a second sub-query;
   performing, by one or more computer processors, a search for each of the sub-queries and the compound search query;
   receiving, by one or more computer processors, a set of results from each search;
   determining, by one or more computer processors, a selection is made of a received result from the search of the first sub-query;
   creating, by one or more computer processors, a new search query that includes text from the selected received result and the second sub-query;
   performing, by one or more computer processors, a second search using the selected received result and the second sub-query; and
   determining, by one or more computer processors, a ranked order for each set of received results, wherein the ranked order is determined based on a weight assigned to each search result obtained, wherein the weight is determined based on a preference of a user, the preference being set prior to entering the search query and including a preference for social media data, geographic location data, and a preference based on a prior history of the user's searches, and one or more of: a relevancy to the search query, and a timeliness of the received result.

2. The method of claim 1, further comprising:
   displaying, separately from any other search results, the set of results from the search of the compound search query.

3. The method of claim 2, further comprising:
   displaying the set of results received from performing the search using the compound search query in a browser tab; and
   displaying each set of results received from performing the search for each sub-query in separate browser tabs.

4. The method of claim 1, wherein the compound search query includes natural language plain text entered by a user.

5. A computer program product for refining search results, the computer program product comprising:
   one or more computer-readable tangible storage device and program instructions stored on the one or more computer-readable tangible storage device, wherein the computer-readable tangible storage device is not a transitory signal per se, the program instructions comprising:
   program instructions to receive a search query;
   program instructions to determine whether the search query is a compound query, wherein a compound query includes at least two search queries separated by at least one logical operator;
   in response to determining the search query is a compound search query, program instructions to parse the compound search query into at least a first sub-query and a second sub-query;
   program instructions to perform a search for each of the sub-queries and the compound search query;
   program instructions to receive a set of results from each search;
   program instructions to determine a selection is made of a received result from the search of the first sub-query;
   program instructions to create a new search query that includes text from the selected received result and the second sub-query;
   program instructions to perform a second search using the selected received result and the second sub-query; and
   determining a ranked order for each set of received results, wherein the ranked order is determined based on a weight assigned to each search result obtained, wherein the weight is determined based on a preference of a user, the preference being set prior to entering the search query and including a preference for social media data, geographic location data, and a preference based on a prior history of the user's searches, and one or more of: a relevancy to the search query, and a timeliness of the received result.

6. The computer program product of claim 5, further comprising:
   program instructions to display, separately from any other search results, the set of results from the search of the compound search query.

7. The computer program product of claim 6, further comprising:
   program instructions to display the set of results received from performing the search using the compound search query in a browser tab; and
   program instructions to display each set of results received from performing the search for each sub-query in separate browser tabs.

8. The computer program product of claim 5, wherein the compound search query includes natural language plain text entered by a user.

9. A computer system for refining search results, the computer system comprising:
   one or more computer processors;
   one or more computer-readable tangible storage media;
   program instructions stored on the one or more computer-readable tangible storage media for execution by at least one of the one or more computer processors, the program instructions comprising:
   program instructions to receive a search query;
   program instructions to determine whether the search query is a compound query, wherein a compound query includes at least two search queries separated by at least one logical operator;
   in response to determining the search query is a compound search query, program instructions to parse the compound search query into at least a first sub-query and a second sub-query;
   program instructions to perform a search for each of the sub-queries and the compound search query;
   program instructions to receive a set of results from each search;
   program instructions to determine a selection is made of a received result from the search of the first sub-query;
   program instructions to create a new search query that includes text from the selected received result and the second sub-query;
   program instructions to perform a second search using the selected received result and the second sub-query; and
   determining a ranked order for each set of received results, wherein the ranked order is determined based on a weight assigned to each search result obtained, wherein the weight is determined based on a preference of a user, the preference being set prior to entering the search query and including a preference for social media data, geographic location data, and a preference based on a prior history of the user's searches, and one or more of: a relevancy to the search query, and a timeliness of the received result.

10. The computer system of claim 9, further comprising:
    program instructions to display, separately from any other search results, the set of results from the search of the compound search query.

11. The computer system of claim 10, further comprising:
    program instructions to display the set of results received from performing the search using the compound search query in a browser tab; and
    program instructions to display each set of results received from performing the search for each sub-query in separate browser tabs.

12. The computer system of claim 9, wherein the compound search query includes natural language plain text entered by a user.

* * * * *